United States Patent
Bhatia

[11] Patent Number: 6,031,721
[45] Date of Patent: Feb. 29, 2000

[54] COOLING FAN FOR COMPUTING DEVICES WITH SPLIT MOTOR AND FAN BLADES

[75] Inventor: Rakesh Bhatia, San Jose, Calif.

[73] Assignee: Intel Corporation, Santa Clara, Calif.

[21] Appl. No.: 08/974,004

[22] Filed: Nov. 19, 1997

[51] Int. Cl.[7] .................................................. H05K 7/20
[52] U.S. Cl. ...................... 361/695; 361/687; 415/122.1; 415/176
[58] Field of Search .............................. 415/122.1, 124.2, 415/175, 176, 177, 178; 361/694, 695, 687

[56] References Cited

U.S. PATENT DOCUMENTS

| | | | |
|---|---|---|---|
| 757,774 | 4/1904 | Roehrich | 416/100 |
| 1,460,495 | 7/1923 | Molander | 415/122.1 |
| 2,878,991 | 3/1959 | Berman | 415/124.2 |
| 4,449,576 | 5/1984 | Baum et al. | 165/104.33 |
| 4,490,596 | 12/1984 | Hirai et al. | 361/695 |
| 4,661,669 | 4/1987 | Matsushima et al. | 361/695 |
| 4,894,749 | 1/1990 | Elko et al. | 361/695 |
| 5,159,972 | 11/1992 | Gunnerson et al. | 165/32 |
| 5,195,576 | 3/1993 | Hatada et al. | 165/80.3 |
| 5,198,889 | 3/1993 | Hisano et al. | 257/678 |
| 5,313,362 | 5/1994 | Hatada et al. | 361/709 |
| 5,361,188 | 11/1994 | Kondou et al. | 361/695 |
| 5,402,312 | 3/1995 | Kinjo et al. | 361/695 |
| 5,409,055 | 4/1995 | Tanaka et al. | 165/104.33 |
| 5,414,591 | 5/1995 | Kimura et al. | 361/695 |
| 5,458,189 | 10/1995 | Larson et al. | 164/104.33 |
| 5,513,070 | 4/1996 | Xie et al. | 361/700 |
| 5,583,316 | 12/1996 | Kitahara et al. | 174/16.3 |
| 5,588,483 | 12/1996 | Ishida | 165/86 |
| 5,621,613 | 4/1997 | Haley et al. | 361/687 |
| 5,646,822 | 7/1997 | Bhatia et al. | 361/687 |
| 5,646,824 | 7/1997 | Ohashi et al. | 361/699 |

*Primary Examiner*—Edward K. Look
*Assistant Examiner*—Richard Woo
*Attorney, Agent, or Firm*—Jeffrey S. Draeger

[57] ABSTRACT

A fan for a computing device. The fan inclides a motor and a blade portion having a plurality of blades; however, the blade portion is located apart from the motor. A blade driving mechanism connects the motor to the blade such that the blade rotates when the motor is operating.

19 Claims, 5 Drawing Sheets

COOLING FAN FOR COMPUTING DEVICES WITH SPLIT MOTOR AND FAN BLADES

FIELD OF THE INVENTION

The present invention pertains to the field of heat removal from electronic components. More particularly, this invention relates to heat removal from a computing device using a fan.

BACKGROUND

Faster and more powerful computer components allow the design and construction of higher performance portable computing devices such as laptop or notebook computers. Unfortunately, the use of such faster and more powerful computer components often results in increased heat generation by such computing devices.

Additionally, as some computer components shrink and/or increasing computer component integration shrinks overall computer size, electronic components may be arranged in a more compact form. Such increasing component density coupled with decreasing overall computing device size inherently decreases space available for convective airflow and accordingly raises heat dissipation concerns. Thus, improved heat dissipation technology is often needed to maintain operating temperatures within an acceptable range in smaller and/or more powerful portable computing devices.

A portable computing device typically includes a base and a screen which are rotatably attached by a hinge. The base usually has an input device such as a keyboard or a touchpad as well as a number of electronic components. Integrated circuits with the highest clock frequency are typically located in close proximity to each other within the computer base.

Many heat generating computer system components take the form of integrated circuits. Such integrated circuits are typically mounted on a motherboard or another circuit board within the base of the portable computer device. A processor is one component that generates a large amount of heat in a typical computing device. Other electrical components which also generate heat include memory circuits, power supply circuits, and circuit boards such as a video card.

Maintaining operating temperatures of computer system components below certain levels is important to ensure performance, reliability, and safety. Most integrated circuits have specified maximum operating temperatures, above which the manufacturer does not recommend operation. Transistors, the building blocks of integrated circuits, tend to slow down as operating temperature increases. Thus, a computer system that operates its integrated circuits close to or beyond recommended timings may fail as temperature increases.

Additionally, integrated circuits may be physically damaged if temperatures elevate beyond those recommended. Such physical damage obviously can impact system reliability. Finally, the computer system casing should be kept at a temperature which is safe for human contact. This may necessitate spreading of heat throughout a computer system base or efficiently expelling heat to avoid hot spots near certain components such as a processor.

Typically, heat sinks, fans, and heat pipes are employed to dissipate heat from integrated circuits and other electronic components. Increases in heat generation are often accommodated by simply increasing the quantity or size of these heat dissipation elements. The relatively small size of a portable computing device, however, complicates heat dissipation by limiting airflow, crowding heat generating components, and reducing the space available for heat dissipation devices.

Figure 1:
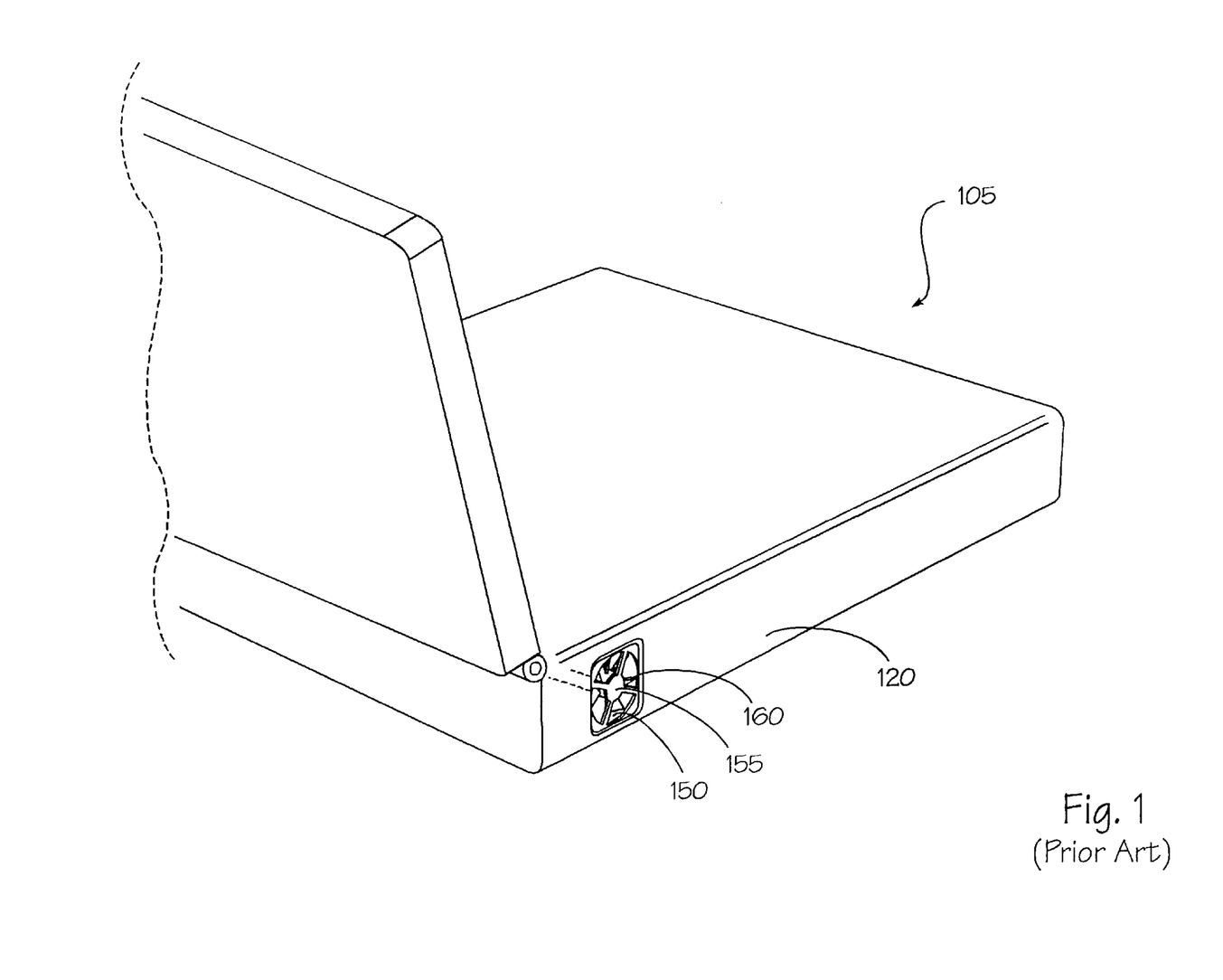
FIG. 1 illustrates a prior art fan used to cool a computing device.

The small size of a portable computing device particularly restricts the use of cooling fans. As is illustrated in FIG. 1, a prior art integral blade fan 150 is typically mounted at an external surface of a portable computing device 105. The fan is an integral blade fan, meaning that the fan blade 155 is integrally formed with, or at least attached to, the rotor portion of the motor 160, and the blades extend axially with the motor in the center.

As illustrated, the fan 150 is mounted in the plane of a side wall 120 of the base of the portable computing device. The side wall 120 is typically used as a vent since the lower surface of the device may be blocked by the surface upon which the device is resting, and the upper surface typically houses a keyboard and may be blocked by the display (when the device is closed) or other objects resting on the device. The side or back of a computing device normally remains unobstructed during operation of the device and is accordingly a better candidate for fan mounting.

One shortcoming of such integral blade fans is that the circumference of the motor limits the blade size since the total fan height is fixed by the form factor of the computer (i.e., the height of side wall 120). Unfortunately, the rapidly shrinking dimensions of portable computing devices have not been accompanied by similar reductions in motor dimensions. As a result, cooling fan blades may need to be downsized, and/or integral blade cooling fans may need to be eliminated, typically resulting in less cooling capacity. Such decreased cooling capacity may prove unacceptable since electronic components which use increasing amounts of power and/or are packaged in a more compact fashion may require the same or increased heat dissipation. Thus, the prior art integral blade fans may no longer continue to meet cooling needs for computing devices.

SUMMARY

A fan for a computing device is disclosed. The fan includes a motor and a blade portion having a plurality of blades; however, the blade portion is located apart from the motor. A blade driving mechanism connects the motor to the blade such that the blade rotates when the motor is operating.

BRIEF DESCRIPTION OF THE FIGURES

The present invention is illustrated by way of example and not limitation in the figures of the accompanying drawings.

DETAILED DESCRIPTION

The present invention provides a split fan for cooling a computing device. In the following description, numerous specific details such as component types, component sizes, and heat dissipation component locations, are set forth in order to provide a more thorough understanding of the present invention. It will be appreciated, however, by one skilled in the art that the invention may be practiced without such specific details.

In various embodiments of the present invention, the split fan may allow removal of additional heat and/or may allow removal of a similar amount of heat while being smaller in at least one dimension. With the ability to remove additional heat, it may become possible to use higher power components or to operate components such as a processor in a portable computing device at a higher power level by either increasing the supplied voltage, reducing clock throttling, or otherwise increasing the operating frequency of the processor. As a result, a portable computing device may be able to obtain higher performance. Where a more compact form results, computing devices may advantageously be made smaller.

Figure 2:
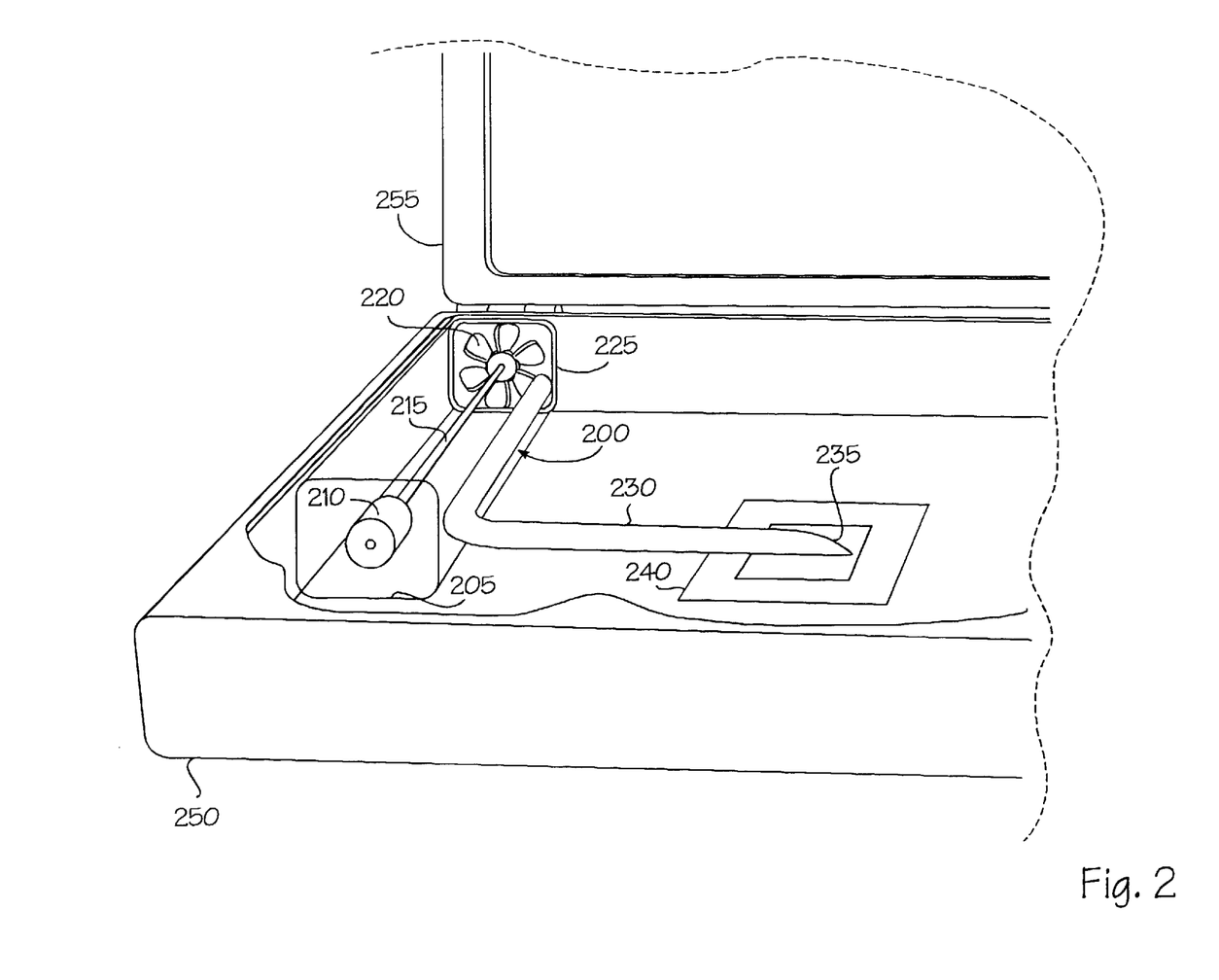
FIG. 2 illustrates a computer system of the present invention which utilizes a split fan with an elongated shaft driving the fan blades.

FIG. 2 illustrates one embodiment of a split fan heat exchanger assembly 200 of the present invention. The fan assembly 200 includes a duct 205 which houses a motor 210 connected by a blade driving mechanism to a blade portion 220 at a vent 225 of the fan assembly 210. In the illustrated embodiment, the blade driving mechanism is formed by an elongated shaft 215.

The fan assembly 200 differs from prior art integral blade fans, such as that shown in FIG. 1, because the blade portion 220 is provided separately from the motor 210. While the blade portion 220 is described as being provided "separately" or "apart from" the motor 210, this is to be understood as meaning that the blades do not extend axially from the motor body (i.e., the stator and/or rotor portions of the motor). In other words, the circumference of the motor body does not limit the blade size as in the prior art because the blades are on a hub, bearing, or similar structure which is located apart from the motor itself. The blade portion 220, the motor 210, and the shaft 215 may, however, be manufactured or otherwise connected together as a part of a single assembly.

As a result of the blade portion 220 being provided separately from the motor 210, a large portion of the height of the base 250 may be dedicated to fan blades because the hub of the blade portion 220 need not contain electronic portions of the motor 210. As portable computing device form factors shrink, the use of an integral fan may be entirely precluded due to small computing device sizes. Thus, the separate blades may allow fan based cooling where such coding with an integral fan would either be impossible or impractical.

In the illustrated embodiment, the fan assembly 200 is disposed in a rear corner (the rear being defined as the edge of the base along which the hinged connection to a display 255 is made) of the base 250 of a portable computing device. While this rear corner placement of the fan assembly 200 is not critical to the present invention, the fan assembly is typically best located away from densely packed heat generating electronic components.

In the illustrated embodiment, the heat pipe 230 has a first end section which is thermally coupled to the heat generating component 235 and a second end section which is thermally coupled to the duct 205. Each of these thermal connections may use a thermal epoxy, solder, or other available type of thermal coupling. The heat pipe 230 transfers heat to the fan assembly 200 from a heat generating component 235 which is mounted on a circuit board 240. In one embodiment, the computing device is a laptop or notebook computer, the heat generating component 235 is a processor, and the circuit board 240 is a motherboard. Additionally, any other available heat transfer element may be substituted for the heat pipe 230 to thermally couple the heat generating component 235 to the fan assembly 200.

The rotation of the motor during operation creates an increased airflow region within the duct 205 by increasing the air passing through the vent 225. The exact shape of the duct 205 is not critical to the present invention, and, in fact, any type of heat dissipation element or set of heat fins may be used. To effect cooling, heat from a remote electronic component is transferred to a heat dissipation element in a region of increased airflow created by the split fan.

Figure 3:
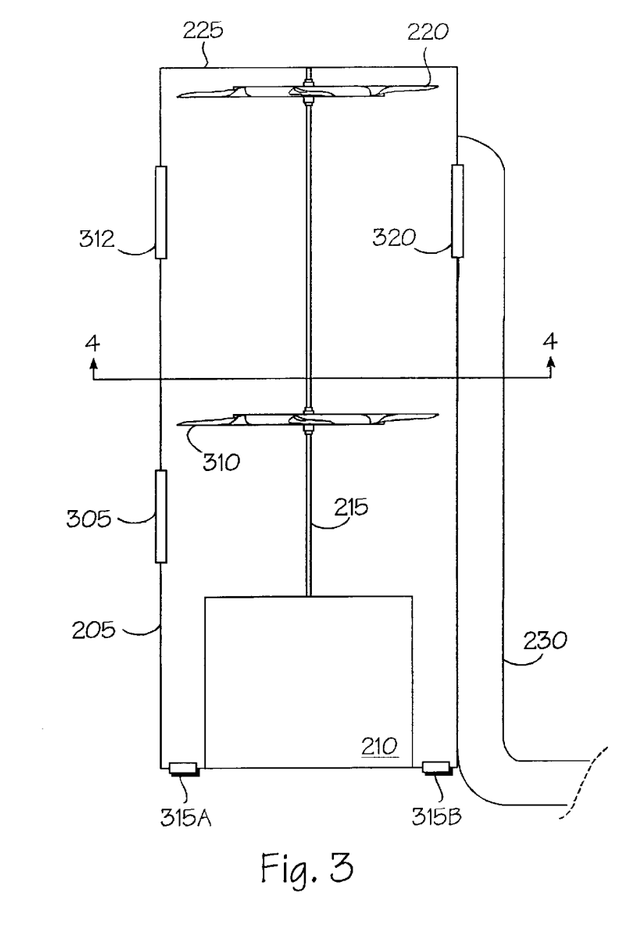
FIG. 3 illustrates a plan view of one embodiment of the fan assembly 200 of FIG. 2.

Further details of one embodiment using the duct 205 are shown in FIG. 3. In this embodiment, a second fan blade portion 310 is attached to the elongated shaft 215 and provided between the motor 210 and the first blade portion 220. This series far arrangement improves airflow throughout the duct 205, and even more blade portions may added along the elongated shaft if further improved airflow is desired.

Additionally, several air vents are illustrated in FIG. 3. The air vents may include exterior vents, such as vents 305 and 312, which allow the introduction of air from outside of the base 250. Additionally, interior vents, such as vents 315a, 315b, and 320, may increase airflow through the base 250. While one embodiment expels air through the vent 225, the direction of airflow is not critical to the present invention, as long as a region of increased airflow is produced.

It should be noted that the motor 210 need not necessarily be disposed within the duct 205. Such a location may allow cooling of the motor 210 since it will be within the increased airflow region; however, if cooling of other electronic components is more crucial, the motor 210 may be placed outside the duct 205 with its blade driving mechanism (i.e., the elongated shaft 215) extending into the duct 205.

Figure 4:
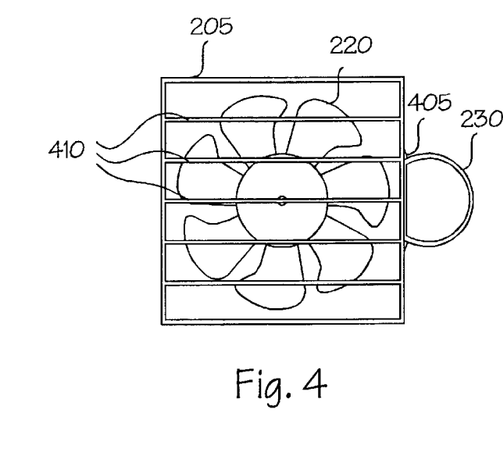
FIG. 4 illustrates a cross sectional view taken through the section lines 4—4 of the fan assembly 200 illustrated in FIG. 3.

FIG. 4 illustrates further details of the duct 205 shown in the embodiment of FIG. 3. Specifically, FIG. 4 depicts a view of the duct 205 taken along section lines 4—4 of FIG. 3. A plurality of fins 410 are shown inside the duct 205. These fins 410 extend substantially perpendicular to and longitudinally along the duct wall to which the heat pipe 230 is thermally coupled. The fins 410 are made of a metal or other high thermal conductivity material. FIG. 4 also illustrates that the thermal coupling is accomplished using a thermal coupling means 405 such as solder or thermal epoxy.

The fins 410 may advantageously improve the heat dissipation capacity of the fan assembly 200. Heat from the heat pipe 230 is transferred away from the side wall to which the heat pipe 230 is attached to the middle of the chamber defined by the duct 205. The airflow through the duct thus passes over an increased surface area due to the fins 410, thereby providing increased heat transfer to air flowing through the duct 205.

Figure 5:
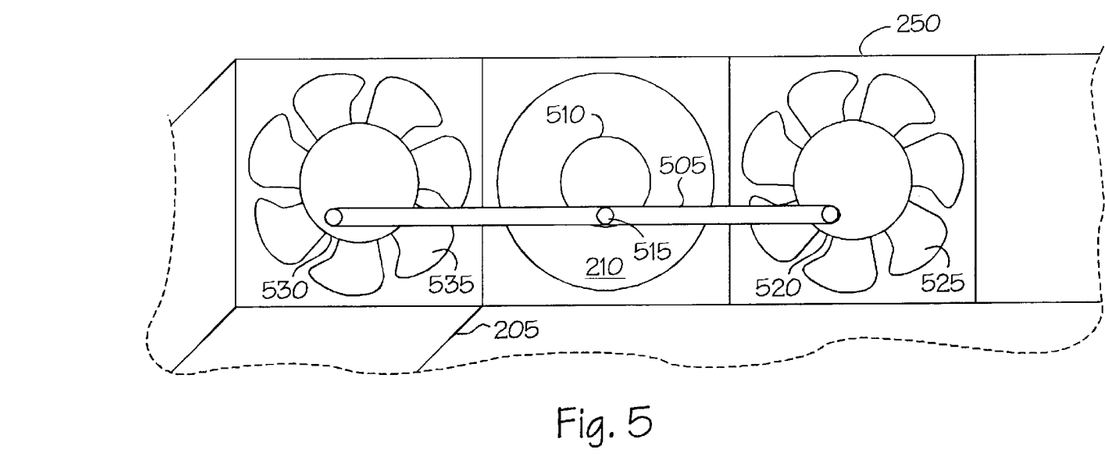
FIG. 5 illustrates a fan assembly of the present invention which uses a connecting arm to drive the fan blades.

FIG. 5 illustrates an embodiment utilizing a motor 210 which is again provided separately from the fan blades. In this case, the motor 210 and first and second blade portions 535 and 525 are disposed adjacent to one another and have substantially parallel axes of rotation.

In this embodiment, the blade driving mechanism is a connecting arm 505. The connecting arm 505 may be formed using a single rigid connecting arm or two separate rigid connecting arm portions to connect to the different fan blade portions. The connecting arm will typically be steel or aluminum; however, any sufficiently rigid compound may be used. In any case, the connecting arm 505 is connected to a bearing at a mounting point 515 eccentrically located (i.e., off center with respect to the axis of rotation of the motor) on a hub 510 of the motor 210. The motor 210 is drivingly attached to the first blade portion 535 by the connecting arm 505 which has an end attached to a hub 530 via a bearing at a point eccentrically located on the huo 530. Similarly, the motor 210 drives the second blade portion 525 via another end of the connecting arm 505 which is attached to a second hub 520 via a bearing at a point eccentrically located on the second hub 520.

The first blade portion 535 may produce an increased airflow region in a duct such as the duct 205 shown in FIGS. 2–4. The second blade portion 525 may create a second and separate region of increased airflow which may generally cool the computing device or may be specifically targeted to increase airflow in the region of one or more peripheral devices. Alternatively, the second blade portion may also cool a second heat dissipation element such as the duct 205 or another type of heat spreader plate.

Figure 6:
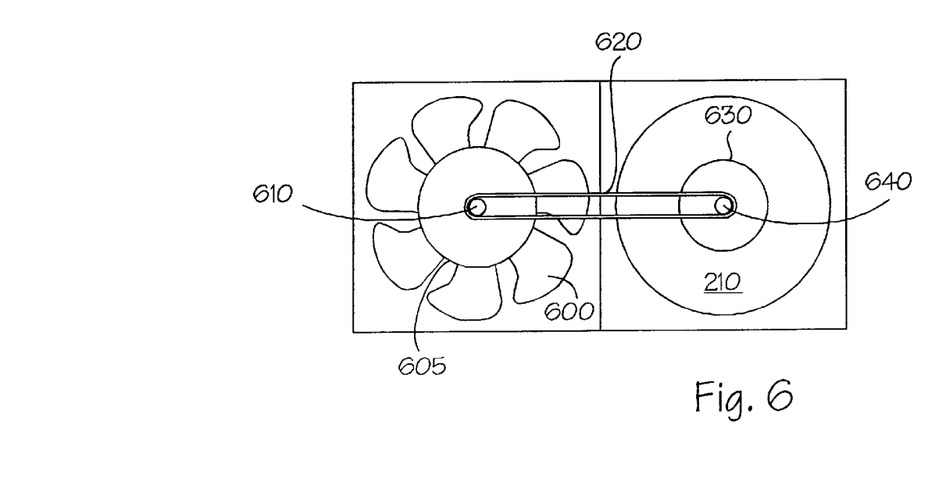
FIG. 6 illustrates a fan assembly of the present invention which uses a belt to drive the blade portion of the fan.

FIG. 6 illustrates an embodiment which is similar to that shown in FIG. 5 in that the motor and a blade portion 600 are adjacent and have substantially parallel axes of rotation; however, the embodiment of FIG. 6 utilizes a belt 620 as the blade driving mechanism to transfer the rotational motion from the motor 210 to the blade portion 600. The hub 610 of the fan portion 600 and the hub of the motor 210 both respectively include drive wheels 610 and 640 having channels adapted to engage the belt 620. This arrangement can be extended to include two sets of blades similarly to the embodiment pictured in FIG. 5 by adding an additional belt to drive the new set of blades and an additional drive wheel to the hub 630 of the motor 210.

Figure 7:
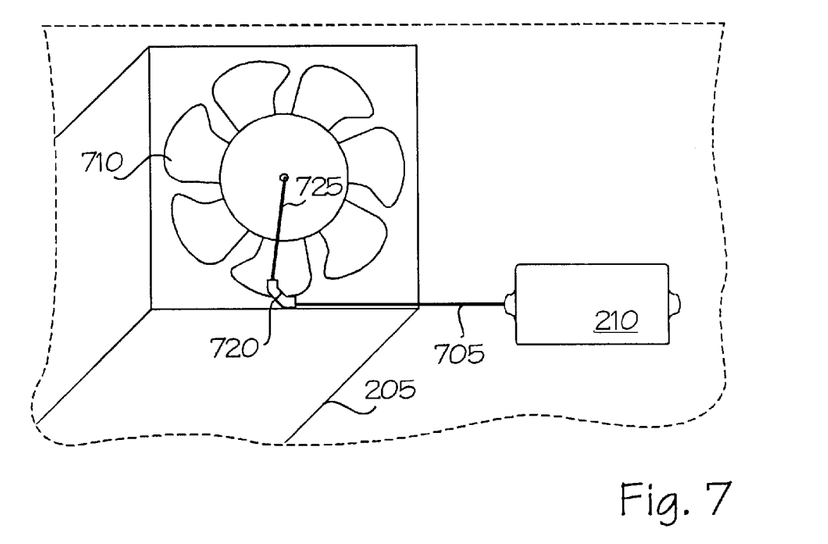
FIG. 7 illustrates a fan of the present invention utilizing a universal joint to drive the blade portion.
Figure 8:
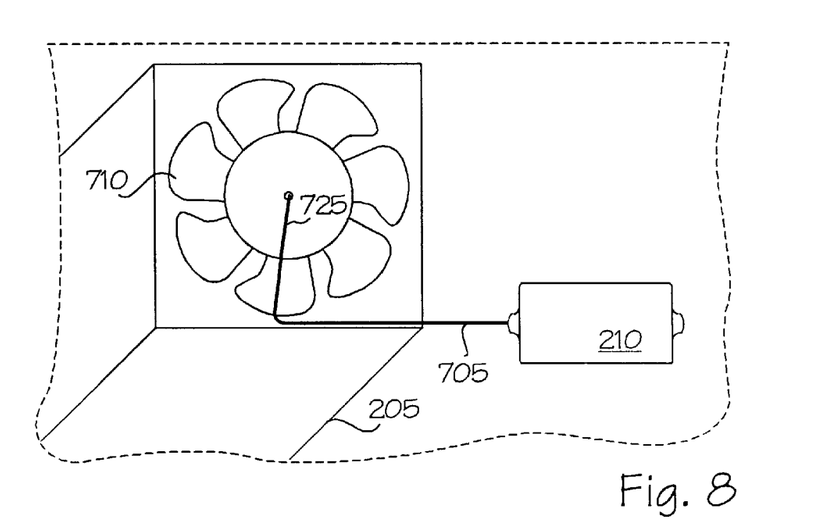
FIG. 8 illustrates a fan of the present invention utilizing a flexible shaft to drive the blade portion.

FIGS. 7 and 8 illustrate two additional embodiments which improve the flexibility of placement of the motor 210. Such flexibility is advantageous since, in some cases, space along the rear or side of the base 250 of the computing device may be limited. The embodiment of FIG. 7 allows the motor 210 to be positioned at an angle to the blade portion 710. In this case, a first shaft 705 and a second shaft 725 are joined by a universal joint 720 to form the blade driving mechanism. The universal joint 720 allows the motor 210 to be placed at a variety of angles to the blade portion 710. As illustrated, the blade portion 710 has an axis of rotation which is substantially perpendicular to the axis of rotation of the motor 210.

In FIG. 8, the blade driving mechanism is a flexible shaft 805. Such a flexible shaft also permits variation of the angle between the motor 210 and the blade portion 710. Thus, with a flexible shaft, the motor 210 may be placed parallel to the motor, perpendicular to the motor, or just to some degree offset from parallel to the motor. Additionally, the flexible shaft 805, being a single integral piece, may have the advantage of providing a lower cost solution.

Thus, the present invention provides a number of split fan assemblies which may be used to cool a computing device such as a notebook computer. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A fan for a computing device comprising:
   a motor disposed within the computing device;
   a blade portion including a plurality of blades, the blade portion being located within the computing device and apart from the motor;
   a blade driving mechanism comprising an elongated shaft coupling the motor to the blade portion to produce rotational motion of the blade portion when the motor is operating; and
   a duct through which the blade portion increases airflow when rotating, wherein the elongated shaft extends a substantial portion of a length of the duct.

2. The fan of claim 1 further comprising:
   a second blade portion attached to the elongated shaft between the blade portion and the motor.

3. The fan of claim 1 wherein said elongated shaft extends at least several times a width of the motor along a rotational axis of the motor.

4. The fan of claim 1 further comprising:
   a second blade portion attached to the elongated shaft and located within the duct.

5. The fan of claim 1 further comprising:
   a heat transfer device thermally coupled to the duct.

6. The fan of claim 5 wherein the heat transfer device is a heat pipe.

7. The fan of claim 6 wherein the heat pipe is coupled to an electronic component.

8. A fan assembly for a computing device comprising:
   a motor disposed within the computing device and having a rotor portion which rotates on a first rotational axis;
   a first blade portion mounted in the computing device, the first blade portion being offset from being parallel to the first rotational axis;
   a driving mechanism coupling the rotor portion to the blade portion; and
   a duct through which the first blade portion increase airflow when rotating, wherein the driving mechanism extends a substantial portion of a length of the duct.

9. The fan of claim 8 wherein the first rotational axis is approximately perpendicular to an axis of rotation of the first blade portion.

10. The fan of claim 8 wherein the blade driving mechanism comprises a universal joint.

11. The fan of claim 8 wherein the blade driving mechanism comprises a flexible shaft.

12. The fan assembly of claim 8 further comprising:
    a heat pipe therrrlally coupled to the duct.

13. The fan assembly of claim 12 wherein said heat pipe is thermally coupled to an electronic component.

14. A fan assembly comprising:
    a motor disposed within a computing device and having a rotor portion which rotates on a first rotational axis;
    a first blade portion mounted in the computing device and having a second rotational axis substantially parallel to the first rotational axis;
    a blade driving mechanism mechanically coupling the rotor portion to the first blade portion a duct through which the first blade portion increase airflow when rotating, wherein the blade driving mechanism extends a substantial portion of a length of the duct.

15. The fan assembly of claim 14 wherein the blade driving mechanism comprises a belt which drives the first blade portion by driving a blade hub from a rotor hub of the motor.

16. The fan assembly of claim 14 further comprising:

a second blade portion having a third rotational axis substantially parallel to the first rotational axis, wherein the blade driving mechanism also couples the motor to the second blade portion to produce rotational motion of the blade portion when the motor is operating.

17. The fan assembly of claim 16 wherein the blade driving mechanism comprises a connecting arm drivingly coupling the rotor portion of the motor to the first blade portion and the second blade portion.

18. The fan assembly of claim 14 further comprising:

a heat pipe thermally coupled to the duct.

19. The fan assembly of claim 18 wherein said heat pipe is thermally coupled to an electronic component.

* * * * *

UNITED STATES PATENT AND TRADEMARK OFFICE
CERTIFICATE OF CORRECTION

PATENT NO. : 6,031,721
DATED : February 29, 2000
INVENTOR(S) : Bhatia It is certified that error appears in the above-identified patent and that said Letters Patent is hereby corrected as shown below:

In item [57], at line 1, delete "inclides" and insert --includes--.

In column 2, at line 22, delete "betcer" and insert --better--.

In column 3, at line 56, delete "coding" and insert --cooling--.

Signed and Sealed this

Fifteenth Day of May, 2001

*Attest:*

NICHOLAS P. GODICI

*Attesting Officer*   *Acting Director of the United States Patent and Trademark Office*